Oct. 15, 1935.   F. R. CHESTER   2,017,233
LOUPE
Filed Feb. 26, 1934
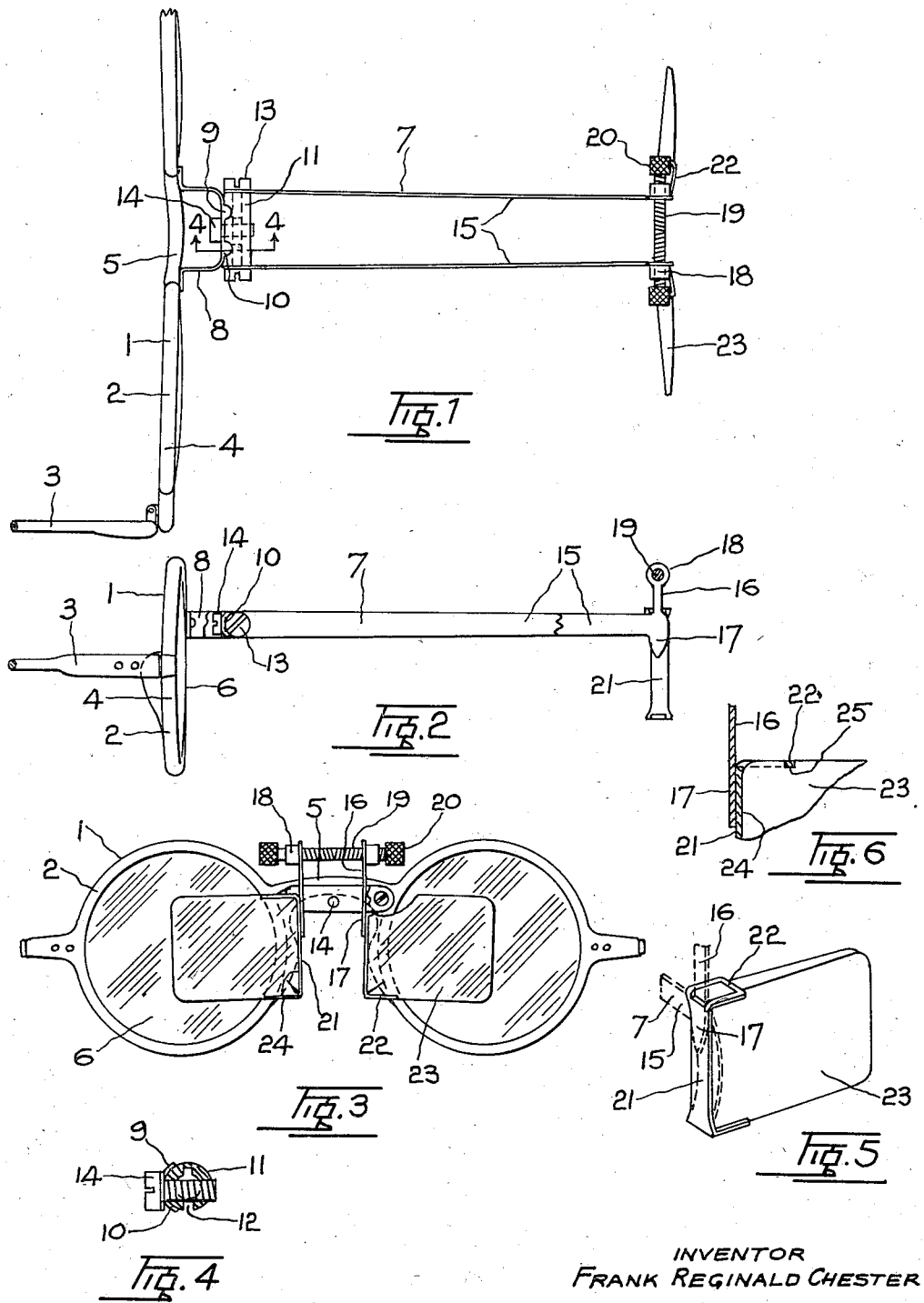
INVENTOR
FRANK REGINALD CHESTER
BY Fetherstonhaugh & Co
ATTORNEYS Patented Oct. 15, 1935

2,017,233

UNITED STATES PATENT OFFICE 2,017,233

LOUPE

Frank Reginald Chester, Vancouver, British Columbia, Canada, assignor to Chester Bros. Ltd., Vancouver, British Columbia, Canada Application February 26, 1934, Serial No. 712,866

5 Claims. (Cl. 88—41)

My invention relates to improvements in loupes, which are particularly adapted for use by dentists, throat specialists, and others having close fine work to do wherein magnification of the parts operated upon is desirable. The objects of the present invention are to provide means whereby the front lenses may be easily and conveniently adjusted, the lens support so arranged and mounted that it does not intersect the vision when in use; to provide an adjustment whereby ease of operation is maintained and accidental slipping is avoided; to provide a mount for the front lenses giving a minimum of metallic obstruction to the vision, and to provide a structure of such little weight as to avoid fatigue to the user, as will be more fully described in the following specification and shown in the accompanying drawing, in which:—

Fig. 1 is a plan view of the invention.

Fig. 2 is a side view of the invention with parts broken away.

Fig. 3 is a front view of the invention.

Fig. 4 is an enlarged sectional view of the support hinge taken on the line 4—4 of Figure 1.

Fig. 5 is a perspective view of the mount of one of the lenses.

Fig. 6 is a fragmentary sectional view of said mount.

In the drawing like characters of reference indicate corresponding parts in each figure.

The numeral 1 indicates a pair of spectacles consisting of a frame 2, temples 3, eye frames 4, bridge 5 and spectacle lenses 6.

Mounted upon the frame 2, at the intersection of the eye frames 4 and the bridge 5, or where there is the greatest width of material for drilling, is a support generally indicated by the numeral 7, which support consists of a substantially U-shaped member 8 having at its base pairs of curved lugs 9 which with the base of the U-shaped member forms a substantially semi-cylindrical channel 10 for a hinge barrel 11. The hinge barrel is slotted longitudinally to more than half its diameter as at 12 and is internally threaded at each end to receive hinge screws 13, and is secured in position within the channel 10 by a single screw 14, which serves also to contract the barrel transversely and grip the screws 13 against turning. Hingedly connected to the hinge barrel 11 is a pair of spring blades 15 having at their free ends an upward extension 16 and a downward extension 17, the upward extension 16 is reduced in width so as to permit it to spring very slightly about its vertical axis and is provided with a transversely disposed nut 18 at its free end. The nuts 18 are tapped right and left hand and are adjustably connected together by a right and left hand screw 19 having a knurled knob 20 at its free ends, or at the longitudinal centre of said screw if desired. Secured to the downwardly turned extension 17 of each of the blades 15 is a mount 21 which consists of a strip of metal which is outwardly curved, as shown in dotted line in Figure 5, intermediate its length and is provided with outwardly turned rectangular loops 22 at each end. Fitted in each of the mounts 21 is an object lens 23 which is preferably rectangular in form having a straight inner edge 24 and being slotted top and bottom as at 25 to receive the outer margin of the loops 22 of the mount 21.

By virtue of the outward curvature of the mount 21 bearing upon the straight edge 24 of the object lens, said lens is securely but resiliently held in position by the mount.

In use, the object lenses are supported parallel to the spectacle lenses, and when not required for the moment, are pushed up above the line of vision, so that it is necessary to adjust the screws 13 to permit the support 7 to swing with relative freedom, providing only such tension as is required to maintain the support in extended position as shown. The screw 14, which secures the hinge barrel in position and contracts it diametrically, holds the screws 13 against rotational movement, hence the effort required to swing the support remains constant and no slackness can develop except through excessive wear.

By forming the support with straight spring blades 15, each abutting at their inner ends a solid cylinder end, and being properly secured thereto by cap screws, distortion of the support with consequent disalignment of the object lenses with respect to the spectacle frame is precluded. Due to the use of spring blades which are straight and substantially parallel at the maximum width of object lens setting, a minimum of strain is imposed on the connection between the nuts 18 and upward extension 16 of the spring blades 15 when the screw 19 is turned to draw the lenses together, consequently no breakages occur and no appreciable binding strain is felt when turning said screw.

What I claim as my invention is:

1. A pair of loupes comprising a spectacle frame, an object lens support and a pair of object lenses carried thereby, said support consisting of a cylindrical hinge barrel carried by the spectacle frame, screws entering the ends of the barrel, a pair of spring blades journalled at one end upon the screws and supporting the object lenses at the other end, and means for clamping the screws against rotation within the hinge barrel.

2. A pair of loupes comprising a spectacle frame, a U-shaped member secured at its extremities to the intersection of the eye pieces and bridge of said frame, a cylindrical hinge barrel carried by the base of the U-shaped member, screws entering the ends of the barrel, a pair of spring blades journalled upon the screws, said blades carrying at their outer extremity a pair of object lenses and a further screw for securing the barrel to the U-shaped member and for holding the first named screws against rotation.

3. In a pair of loupes having a spectacle frame and an object lens support connected to the frame, a hinge for connecting the support comprising a substantially cylindrical barrel slotted longitudinally, a screw threadedly engaging each end of the barrel, a blade journalled upon each screw, and means for contracting the barrel transversely to hold the screws against rotation.

4. In a pair of loupes, a pair of supporting blades, a pair of object lenses carried thereby, said lenses having their adjacent side edges substantially straight and having a slot on their upper and lower edges and a mount secured to each supporting blade, said mount consisting of a strip of material intermediately curved towards the said straight side edge of a lens, and an outwardly turned loop at each extremity adapted to enter the slots of the lens to hold the lens within the mount.

5. In a pair of loupes, a lens support and a pair of mounts, a pair of object lenses carried in the mounts from the lens support, one of said mounts consisting of a strip of sheet material having a loop at each end engaging the inner side edge of its lens and presenting only its minimum dimension to the line of vision through the loupe.

FRANK REGINALD CHESTER.